United States Patent
De Kermadec

(10) Patent No.: US 6,807,411 B1
(45) Date of Patent: Oct. 19, 2004

(54) TELECOMMUNICATION EQUIPMENT WITH AT LEAST ONE STORAGE LOCATION RESERVED FOR OPERATOR-MANAGED DATA AND CORRESPONDING METHOD

(75) Inventor: M. Alain De Kermadec, Paris (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 0 days.

(21) Appl. No.: 09/526,774

(22) Filed: Mar. 16, 2000

(30) Foreign Application Priority Data

Apr. 1, 1999 (FR) .......................................... 99 04296

(51) Int. Cl.[7] .............................................. H04M 11/10
(52) U.S. Cl. .................. 455/412.1; 455/466; 455/413; 379/88.22
(58) Field of Search ............................ 455/550, 412.1, 455/413, 412.2, 466, 186.1, 556–558, 575, 414.1, 550.1, 575.1, 556.1, 556.2; 340/825.21, 825.25, 7.46, 7.45, 7.48; 379/67.1, 41, 88.16, 88.18, 88.22, 88.23, 88.24, 88.25, 88.26, 88.08, 88.17, 142.01, 201.1, 173, 185; 370/466

(56) References Cited

U.S. PATENT DOCUMENTS 4,873,519 A * 10/1989 Matai et al. ............ 340/825.44
5,561,702 A * 10/1996 Lipp et al. ...................... 379/57
5,687,216 A * 11/1997 Svensson ...................... 379/58
5,705,995 A * 1/1998 Laflin et al. ........... 340/825.44
6,067,529 A * 5/2000 Ray et al. ...................... 705/26
6,087,956 A * 7/2000 Helferich ............... 340/825.44
6,097,967 A * 8/2000 Hubbe et al. ................ 455/558
6,353,737 B1 * 3/2002 Herzog ....................... 455/418
2002/0049049 A1 * 4/2002 Sandahl et al. ............. 455/414

FOREIGN PATENT DOCUMENTS

| EP | 0 851 649 | 7/1998 | |
| FI | WO 96/06508 A2 * | 2/1996 | |
| FI | WO 97/32439 A2 * | 9/1997 | ............ H04Q/7/32 |
| FR | 2 742 290 | 6/1997 | |
| FR | 10418334 A1 * | 10/2000 | ............ H04Q/7/32 |
| WO | 97/32439 | 9/1997 | |

* cited by examiner

Primary Examiner—Edward F. Urban
Assistant Examiner—C. Chow
(74) Attorney, Agent, or Firm—Kinney & Lange, P.A.

(57) ABSTRACT

A telecommunication method and system has a storage means for storing short messages received and/or to be transmitted. The storage means has N short message storage locations. Each of the short messages has a header field and a data field. At least one of the storage locations is reserved for storing short messages having a predetermined address, which is set by the operator implementing the telecommunication equipment.

13 Claims, 2 Drawing Sheets

TELECOMMUNICATION EQUIPMENT WITH AT LEAST ONE STORAGE LOCATION RESERVED FOR OPERATOR-MANAGED DATA AND CORRESPONDING METHOD

CROSS-REFERENCE TO RELATED APPLICATION(S)

This application claims priority under 35 U.S.C. §119(a) based on French Patent Application No. 99 04296 filed Apr. 1, 1999.

BACKGROUND OF THE INVENTION

This invention relates to the field of telecommunications, in particular to mobile phone equipment.

Indeed, it is known that telecommunication system operators wish to offer many complementary services, beyond the mere telephone communication service. E.g., this can involve options or functions offering various additional services managed by an operator, such as indications relating to the account of the equipment owner, and/or a service provider (who can be the operator), such as the reservation of a cinema ticket or the broadcasting of information classified by subject.

In order to provide these various services, it is necessary to transmit and manage specific data in telecommunication equipment. This data transmitted by the operator is called hereafter "operator data".

This invention relates in particular to the processing of such operator data in telecommunication equipment.

The inventive telecommunication equipment may in particular, but not exclusively, be a radiotelephone (or mobile equipment, or ME according to the terminology of GSM for "Global System for Mobile communications"), e.g. compatible with a radiocommunication system of the type of GSM, DCS 1800 (for "Digital Cellular System 1800 MHz"), PCS 1900 (for "Personal Communication System"), DECT (for "Digital European Cordless Telecommunications"), or else UMTS (for "Universal Mobile Telecommunication System").

The technical specifications of this type of equipment require it to be capable of transmitting and receiving alphanumerical-type messages, conventionally called short messages (or "SMS", for "Short Message Service").

One of the applications of such short messages is to enable one user to communicate with another one. This is referred to as "short user messages". E.g., they inform the user that he has received a voice message on his answering machine.

Another application of such short messages is to enable the operator to transmit the above-mentioned operator data to the equipment. This is then referred to as "short operator messages".

Short messages are composed of a header field and an alphanumerical data field, or text field.

In general, there are the following classes of short messages:

class 0: short messages simply displayed fleetingly, but not stored;
class 1: short messages stored in the memory of the telecommunication equipment;
class 2: short messages stored in the memory of a subscriber identity module (or SIM card) with which the equipment is cooperating;
class 3: short messages stored in the memory of a peripheral (e.g. a notebook computer connected to the telecommunication equipment);
undetermined class: short messages having no predetermined storage destination.

Whatever the memory involved (that of the telecommunication equipment, the subscriber identity module or the peripheral), the number of locations is limited to ten or twenty short message locations.

Short messages received or to be transmitted that are stored in memory (short message list) can be read for instance on the telecommunication equipment display, by scrolling.

Of course, the equipment comprises a management means enabling the user to delete short messages partially or totally. In general, the user deletes short messages once he has viewed them.

We will now discuss the problems related to the problems of managing the short message memory of the subscriber identity module. Obviously, the same problems arise for managing other short message memories.

At present, short message memory management applies in the same way to both short user messages and short operator messages.

And yet, this single management poses annoying problems for the operator. Indeed, it often happens that the user manages his short message memory badly, in particular by not regularly deleting short messages that have become obsolete. This results in the congestion of the short message memory and therefore the impossibility of receiving further short messages. Although such impossibility may be hardly annoying for a user, it may prevent the operator from providing the correct operation of certain services. E.g., the operator can no longer inform the user by means of a short message that he has received a voice message on this answering machine.

Furthermore, this single management may make the user prematurely delete short operator messages, before they are processed by the equipment or the subscriber identity module.

One solution could be to store short operator messages in a memory other than that used for storing short user messages. However, such a solution is hardly acceptable and cannot be chosen, because it does not comply with current standards, and implementing it would be complicated and costly.

SUMMARY OF THE INVENTION

In particular, it is the object of this invention to compensate for the various disadvantages of the state of the art.

More precisely, it is an object of this invention to provide a technique making it possible to facilitate and improve the management and storage of short "operator" messages.

It is another object of the invention to provide such a technique that gives the operator the opportunity of being able to route his short operator messages securely.

It is yet another object of the invention to provide such a technique making it possible to avoid the deletion of short operator messages before they are being processed by the equipment.

It is another object of the invention to provide such a technique that does not require any adaptation to the telecommunication equipment.

It is an object of the invention to provide such a technique that is compatible with current telecommunication equipment.

It is yet another object of the invention to provide such a technique enabling the optimization of available resource allocation.

These various objects, as well as others that will be apparent subsequently, will be achieved according to the invention using a telecommunication equipment comprising a means for storing short messages received and/or to be transmitted, each of said short messages comprising a header field and a data field, said storage means comprising N short message storage locations, characterized in that at least one of said storage locations is reserved for storing short messages with a predetermined address, set by the operator implementing said telecommunication equipment.

The general principle of the invention therefore consists in distinguishing between two separate and partitioned areas within the same memory, one for storing short operator messages, and the other for storing short user messages.

Reserving storage locations for short operator messages allows the operator to transmit his short operator messages without the risk of memory congestion or conflicts with short user messages, or even accidental deletion by the user.

Indeed, only the operator is capable of acting on the contents of such reserved locations for modifying and/or updating them.

It should be noted that the term operator not only designates the operator of the telecommunication network, but also a possible service provider contracted by the operator.

Preferably, said predetermined address is permanently stored in the memory area corresponding to the short message header field of said dedicated storage location.

It is known that the management means of the storage means generally comprises a control for totally deleting its contents. This deleting operation can be risky, and as explained above (and thus being another reason for those skilled in the art not to envisage the solution of the invention). Such risks are eliminated, according to the invention, by reloading the address into the memory area corresponding to the header field immediately after said deletion. It is the reloading of the address that allows the location involved to remain assigned to storing a short operator message.

Of course, in parallel with address reloading, it can be envisaged to reload also the data associated with the corresponding short message into the memory area corresponding to the data field immediately after deletion. This allows short operator messages not yet processed to be retained.

If reloading only involves the address of the dedicated storage location, the operator may decide to send again the short operator messages not yet processed that had been stored and have been deleted.

According to a preferred embodiment of the invention, reloading said address is done from a buffer memory, whereto said address has been transferred before said deletion.

It is interesting to note that reloading can also imply "operator" data concerning the reloaded address.

Such a buffer memory is advantageously located inside the subscriber identity module.

According to a specific embodiment of the invention, said storage means comprises at least three storage locations dedicated to storing short messages corresponding to at least three predetermined addresses.

However, it is clear that the invention does not impose any constraint as to the number of storage locations reserved for storing short "operator" messages, within space available.

In this specific embodiment, said predetermined addresses respectively correspond to:

information related to an answering machine management service (providing in particular notification through short operator messages of voice messages existing in the answering machine).

information corresponding to a download message;

information related to the user's telephone consumption.

Advantageously, at least one of said predetermined addresses is downloadable.

In this way, the operator can, at any time, modify and/or update and/or add new predetermined addresses, corresponding for instance to new services.

In a preferred embodiment of the invention, a radiotelephone of a radiocommunication system is involved.

E.g., said radiocommunication system belongs to the group of:

GSM-type radiocommunication systems;

DCS 1800-type radiocommunication systems;

PCS 1900-type radiocommunication systems;

UMTS-type radiocommunication systems;

DECT-type radiocommunication systems.

Of course, this list of radiocommunication systems is not exhaustive.

In a preferred embodiment of the invention, said storage means and/or said buffer memory are at least partially present on a removable data medium to be inserted into a corresponding drive of said telecommunication equipment, and said removable data medium is integrated at least partially into a subscriber identity module.

The invention also relates to a method of managing means for storing short messages received and/or to be transmitted, implemented by the telecommunication equipment described before. In particular, such a method comprises a step of reserving at least one of said storage locations for storing short messages with a predetermined address, set by the operator implementing said telecommunication equipment.

Other features and advantages of the invention will be apparent from reading the following description of a preferred embodiment of the invention, provided by way of example and not to be restrictive, and with reference to the accompanying drawings, wherein:

DETAILED DESCRIPTION

Consequently, the invention relates to a telecommunication equipment allowing in particular to optimize the use of short messages comprising data corresponding to one or several services provided by an operator, and/or directly access such data, in order to be able to manage them in the best possible way.

In the course of the present description, the case of a radiotelephone (or mobile telecommunication equipment) of a GSM-type radiocommunication system is considered as the telecommunication equipment. However, obviously the invention is applicable to any kind of telecommunication equipment (fixed or mobile). Those skilled in the art will easily know how to transpose the invention, in particular in the case of a fixed-type telecommunication equipment.

Figure 1A:
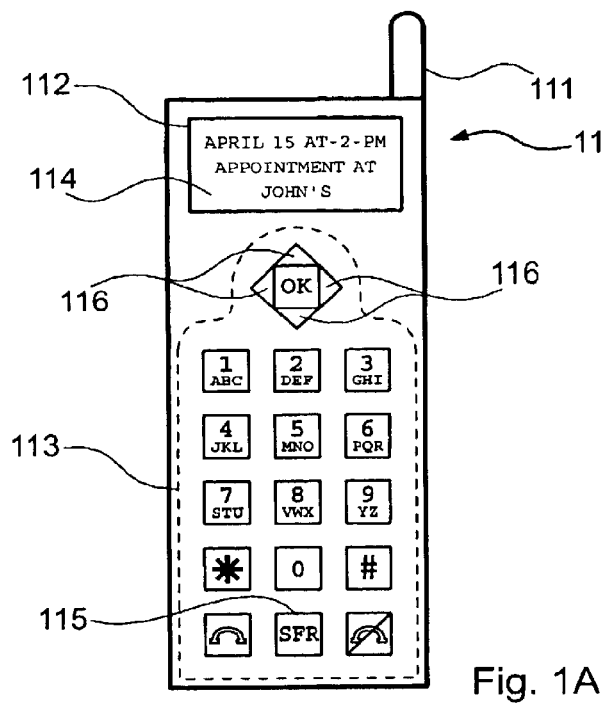
FIGS. 1A and 1B illustrate simplified diagrams of a specific embodiment of a telecommunication equipment and a subscriber identity module according to the invention, respectively.
Figure 1B:
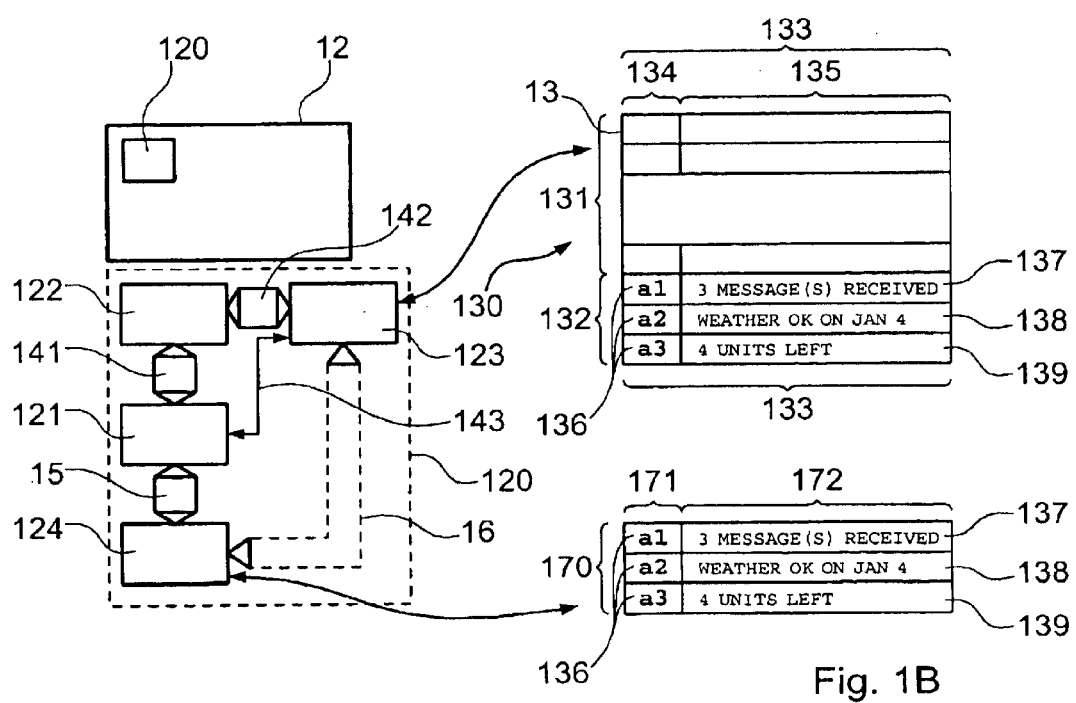

With reference to the simplified diagram of FIG. 1, a specific embodiment of the telecommunication equipment 11 according to the invention will be exposed now.

Conventionally, telecommunication equipment 11 comprises:

- an antenna 111 allowing to transmit and/or receive signals carrying information transmitted via or from a base station (not shown);
- a visual display 112 allowing in particular to view one or more short messages received and/or to be transmitted via the base station;
- a keyboard 113 having a plurality of keys allowing in particular to write a short message to be transmitted, such as the message 114 shown ("appointment scheduled for January 15 at 2 pm at John's place"), as well as to move around, by means of keys 116, within a list 13 of one or more short messages received and/or to be transmitted in order to view them on display 112. Such short messages are described in the GSM 02.03 recommendation (enclosed herein for reference).

Telecommunication equipment 11 cooperates with a removable medium to be inserted into a corresponding drive of telecommunication equipment 11. The removable data medium is for instance a subscriber identity module 12 (or SIM). The subscriber identity module 12 is a card with a microprocessor 120 allowing to store, inside the storage means 123, certain data, including in particular list 13 of short messages received and/or to be transmitted, and to process and manage such data.

Storage means 123 is assigned to short messages received and/or to be transmitted and comprises a number N of fixed locations 130 for storing one or more short messages, e.g. thirteen.

The pair of telecommunication equipment 11/subscriber identity module 12 provides various functions peculiar to the subscriber, the network and security, such as e.g.:

- storing phone numbers;
- storing short messages received and/or to be transmitted;
- storing preferred network operators;
- storing a fixed list of dial numbers the subscriber prefers;
- storing the management of the radiocommunication system involved;
- storing the subscriber's international identification number according to IMSI-TMSI standards;
- storing data characteristic of the base station associated with the cell wherein telecommunication equipment 11 is located;
- authenticating the subscriber in relation to the network;
- passively authenticating the subscriber through a secret code (or PIN for "Personal Identification Number");
. . .

These various functionalities are managed via a software toolkit (or "SIM Toolkit") cooperatively controlling telecommunication equipment 11 and subscriber identity module 12. In order to implement the toolkit, in particular the GSM 11.11 recommendation phase 2 is taken into account, which specifies the mechanisms enabling interoperability between telecommunication equipment 11 and subscriber identity module 12.

In particular, a user of the telecommunication equipment 11 can push an operator-specific key 115 (represented here by the "SFR" (registered trademark) key), for accessing a main menu offering in particular one option allowing to read each short message received and/or to be transmitted present in list 13. It is recalled that the user can also delete, using a second option offered by a menu, at least certain short messages he has already consulted (by viewing them on display 112) and/or that he does not want to see any more (e.g. on display 112). Another control is for deleting all short messages simultaneously and systematically.

Each short message has a size limited to a number of characters amounting to several tens. Each short message has a header field with the short message address and a data field comprising the useful data of the corresponding short message. Each short message is stored inside a storage location 133. The storage location 133 of a short message comprises on the one hand a first area referenced as 134 provided for storing the header field of the short message involved, and on the other hand a second area referenced as 135 for storing the data field of the short message involved.

According to the invention, at least one of the storage locations is reserved for storing short messages with a predetermined address 136, set by the operator implementing telecommunication equipment 11. In other words, provision is made for reserving part of the storage space 130 for short messages received from and/or to be transmitted to a user, so-called short "user" messages for keeping specific short messages, so-called short "operator" messages, managed only by the operator. Such short "operator" messages remain stored inside a predetermined area 132 known to the subscriber identity module 12 (and/or telecommunication equipment 11) and the operator. Consequently, only the operator is capable of finding the storage location reserved for a specific short "operator" message. It is then possible for the operator to have write access (and possibly read access) to the data of the data field of a specific short "operator" message. In particular, the operator can modify and/or update the data of the short "operator" message in order to define it. The user can only consult, with read access, the contents of the data field of this short "operator" message involved without being able to act on its definition (and therefore its writing). The user has neither write nor read access to the storage location having the predetermined address 136 of the short "operator" message.

Reserving storage locations dedicated to storing short "operator" messages implies that the storage means 123 comprises a first storage area 131 for storing short "user" messages, and a second memory area 132 dedicated for storing short "operator" messages.

For simplicity's sake, it is assumed in the course of the description, that several locations are dedicated to short "operator" messages.

Storage means 123 comprises e.g., at least three storage locations reserved for storing short "operator" messages corresponding to at least three predetermined addresses 136 referenced as "a1", "a2", and "a3".

The predetermined addresses 136 of the short "operator" messages are permanently stored in the second memory area 132, inside storage locations 134, corresponding to the header field of the short "operator" message. Consequently, storage locations 134 comprise the header fields of the short "operator" messages, so that it is possible at any time to identify the type of data included in the short message storage locations. This identification can be done in particular during an "operator" data access search (exclusively run by the operator) so as to modify and/or update it and/or for replacing the predetermined address by another predetermined address (e.g., to provide better quality service). As far as the data of the data fields of the short "operator" messages is concerned, it is stored inside the storage locations 135 provided for storing the data fields of the short "operator" messages.

At least one of the predetermined addresses 136 is downloadable. Obviously, it is the operator who decides, depending on his preferences and/or the service providers he has contracted, on the different services to be offered to the user of telecommunication equipment 11. Indeed, the operator can change the number and nature of the short "operator" messages depending on various parameters (information specific to the service provided by the operator, the language used, etc.).

The predetermined addresses 136 of the short "operator" messages respectively correspond to:

information 137 regarding an answering machine management service, such as messages related to the number of voice messages in the voice box managed by the operator and that have not yet been consulted;

information 138 corresponding to a download message, such as messages related to the weather report;

information 139 regarding the user's telephone consumption, such as the amount of remaining credit and/or the total cost of the current call.

List 13 of short "user" messages received and/or to be transmitted and of short "operator" messages is stored in the same short message storage means 123 provided inside the subscriber identity module 12. This storage means 123 is connected, via a link 142, to the address comparison means 122 also integrated inside subscriber identity module 12.

The address comparison means 122 compares, in particular upon receipt of a new short message (via telecommunication equipment 11), the nature of the address included in the header field of the received short message with that or those included in the memory area 132 corresponding to the short message header field. Such a comparison allows to determine the storage location of the received short message, inside the short message storage means 123. Thus, if it is a short "user" message, according to a first possibility, the short message received (having none of the predetermined addresses 136) is stored in a storage location of the first memory area 131. According to a second possibility, i.e. when the short message received has (in its header field) one of the predetermined addresses 136 (the same as one of those contained in the storage location 134 of the second memory area 132), like the address referenced as "a1", "a2", or "a3", then the short message received is stored in the storage location corresponding to the second memory area 132 (possibly overwriting the short "operator" message that is already stored therein). In order to be able to control the address comparison means 122, the data processing and management means 121 is linked thereto, via a link 141.

The data processing and management means 121, making up the decision center, processes and manages in particular data exchanged via the subscriber identity module 12 with telecommunication equipment 11, and the data to be transmitted and/or received of the various means included on the one hand in subscriber identity module 12, and on the other hand in telecommunication equipment 11, such as the short message storage means 123. When the data processing and management means 121 receives a short message via the transmission means (not shown) linked to the drive, the processing means 121 transmits the short message received to the address comparison means 122.

Prior to transmitting a deletion instruction (controlled in particular by a user of telecommunication equipment 11) affecting the whole contents of the storage means 123, the processing means 121 generates an instruction that makes it possible to load each predetermined address 136 (included in the header field of the short "operator" message) and possibly the respective data 137, 138, 139 (included in the data fields) into a memory area 170 provided inside a buffer memory 124.

Buffer memory 124 is an example provided within subscriber identity module 12. According to a first alternative embodiment of the invention (not shown), the buffer memory is located within telecommunication equipment 11. According to a second alternative embodiment of the invention (not shown), buffer memory 124 is included inside a peripheral, such as e.g. a notebook computer connected to equipment 11. According to a third alternative embodiment of the invention (not shown), the storage locations of the predetermined addresses 136 and possibly the "operator" data 137 to 139 are distributed among a buffer memory included in telecommunication equipment 11 and a buffer memory included in subscriber identity module 12, and possible a buffer memory included in a peripheral (like a microcomputer).

The instruction enabling each predetermined address 136 to be loaded comes from the data processing and management means 121 and is directed, via a link 143, to the short message storage means 123. The load instruction enables each predetermined address 136 to be transferred, as well as possibly the associated "operator" data 137, 138, 139, from the storage means 123 to the buffer memory 124. Such a transfer takes place between the storage means 123 and the buffer memory 124, either directly via link 16 or indirectly via data processing and management means 121 and address comparison means 122, i.e. following links 142, 141 and 15, respectively.

When an instruction has been received for deleting the contents of all storage locations, each predetermined address 136 is reloaded into the memory area of the storage means 123 corresponding in particular to the header field of the short "operator" messages. Optionally, the "operator" data is also reloaded into the memory area 132 of the storage means 123 corresponding to the short "operator" message data field. Such reloading therefore makes it possible always to keep in memory the contents of the short messages in spite of their deletion (carried out previously). In order to perform such reloading, each predetermined address 136 is transferred from buffer memory 124 to storage means 123. Just as for loading each predetermined address 136 and possibly the corresponding "operator" data into buffer memory 124, the transfer between buffer memory 124 and storage means 123 is carried out either directly via link 16 or indirectly via data processing and management means 121 and address comparison means 122, i.e. following links 15, 141, and 142, respectively.

It is understood that an operation for deleting the contents of the reserved storage location 132 within storage means 123 consequently does not cause the permanent loss, neither of the predetermined addresses 136 nor possibly of the associated "operator" data 137 to 139 (as buffer memory 124 includes memory area 170 having a identical copy of these predetermined addresses 136 (and possibly of the associated data 137 to 139) that can restore, when appropriate, all the short "operator" messages into storage means 123). This memory area 170 can have the same characteristics as that of the storage locations reserved for short messages concerning "operator" data within storage means 123 (i.e. comprise a memory area 171 corresponding to the header field and a memory area 172 corresponding to the data field, therefore having a copy of the predetermined address 136 and possibly a copy of the associated "operator" data 137 to 139, respectively).

Therefore, this invention offers a simple, high-performance and low-cost architecture for realizing a telecommunication equipment 11 in cooperation with a subscriber identity module 12, which in particular allows "operator" data to be processed and managed efficiently.

Figure 2:
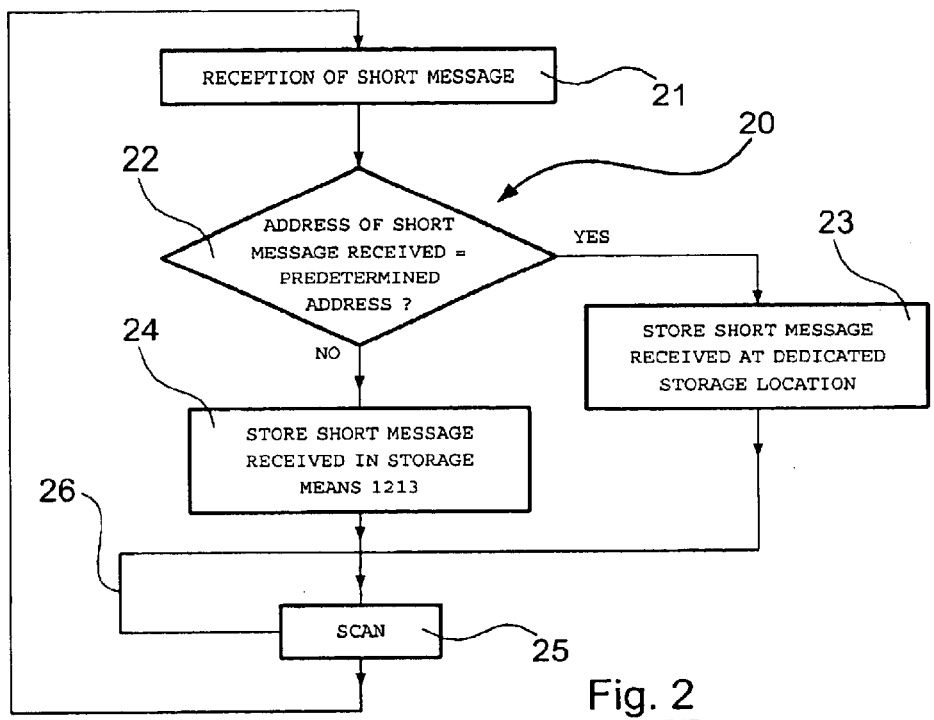
FIG. 2 shows a simplified flow chart of a specific embodiment of a method that can be implemented by the telecommunication equipment of FIG. 1.

Hereafter, with reference to the simplified flow chart of FIG. 2, a specific embodiment of a method that can be implemented by telecommunication equipment 11 will be described.

Conventionally, a method 20 for managing the storage means 123 for short messages received and/or to be transmitted by telecommunication equipment 11 (see FIG. 1) comprises a step 21 of receiving a short message, transmitted via a base station, and meant for a user of telecommunication equipment 11.

According to an essential feature of the invention, a step 22 of analyzing the address of the short message received is performed. This analysis step 22 consists in particular in comparing the address included in the header field of the short message received with each predetermined address of all of the predetermined addresses (included in the memory area 171 of the storage locations reserved for storing short "operator" messages, within the short message storing means 123).

If so, i.e. if the address of the short message received corresponds to a predetermined address 136, it is decided (by the data processing and managing means 121 e.g. subsequently to a transmission of a positive result of the address comparison between the address of the short message received and one of the predetermined addresses) to store 23 the short message received at the storage location dedicated to storing the short "operator" message (i.e. having such an address inside the memory area 132 (provided integrally with short message storing means 123)). The short message received comprises in particular data managed exclusively by the operator involved.

Otherwise, i.e. if the address of the short message received does not correspond to a predetermined address 136, it is decided (by the data processing and managing means 121 e.g. subsequently to a transmission of a negative result of the address comparison between the address of the short message received and the predetermined addresses 136) to store 24 the short message received within a storage location of a short message received and/or to be transmitted within the memory area 131 of the short message storage means 123.

When the short message received has been stored inside the storage means 123, we go on to a scanning step 25, during which telecommunication equipment 11 (possibly driven by data processing and managing means 121) regularly scrutinizes (e.g. at each control clock cycle) whether a new short message has been received by telecommunication equipment 11.

If a new procedure for receiving a short message is required, the before-mentioned operations 21 to 24 are repeated, otherwise telecommunication equipment 11 continues (26) to perform the previous scanning step 25.

Figure 3:
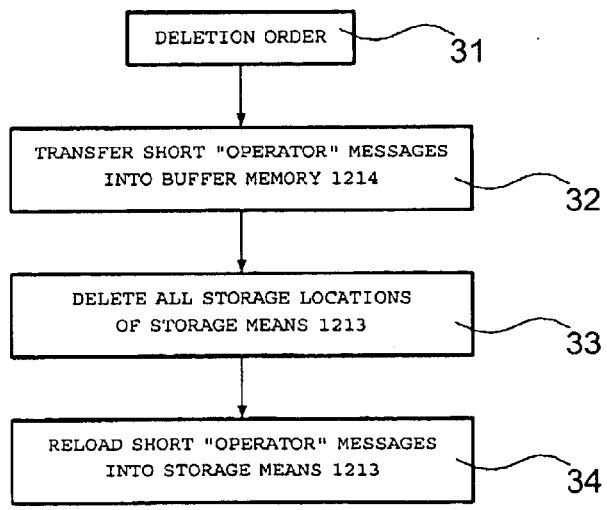
FIG. 3 illustrates, by means of a simplified flow chart, an operating mode that can be implemented within the telecommunication equipment of FIG. 1.

With reference to the simplified flow chart of FIG. 3, a specific operating mode, which can be implemented inside the telecommunication equipment, is briefly explained below.

Conventionally, a user of telecommunication equipment 11 (see FIG. 1) can order (31) deletion, in particular of all of the short messages existing inside storage means 123.

When such a deletion order 31 has been activated, a short message transfer instruction comprising the header fields with predetermined addresses 136 and the data fields with "operator" data is transmitted (32) to the short message storage means 123. Thus, an integral and true copy of the header fields and possibly of the short "operator" message data fields (of memory area 132 of storage means 123) is immediately transmitted to buffer memory 124.

Once the transfer of a short "operator" message copy has been performed, deletion 33 of all storage locations of storage means 123 (i.e. memory areas 131 and 132) is generated. This deletion 33 removes all the data included in the header fields and the data fields of the short message storage means 123.

Then, reloading 34 of short "operator" messages is carried out from buffer memory 124 to short message storage means 123, so that the predetermined addresses 136 (and possibly the corresponding "operator" data 137 to 139) are restored respectively to the header fields and the data fields of memory area 132.

Consequently, short messages managed exclusively by an operator are only removed temporarily. The user of telecommunication equipment 11 can view the short "operator" messages on display 112, at any time, even if he has previously ordered the deletion of all short messages (without realizing that they have been affected by a removal, be it a temporary one).

What is claimed is:

1. A telecommunication equipment in a telecommunication network, the equipment comprising a means for storing short messages received and/or to be transmitted, each of said short messages comprising a header field and a data field, said storage means comprising N short message storage locations, characterized in that at least one of said storage locations is reserved for storing short messages having a predetermined address, set by an operator implementing said telecommunication network, said predetermined address being stored permanently in the memory area corresponding to the header field of the short message of said reserved storage location, such that if a user deletes the contents of said reserved storage location, immediately thereafter said predetermined address is reloaded into said memory area corresponding to the header field.

2. The telecommunication equipment according to the claim 1, characterized in that reloading of said address is performed from a buffer memory, whereto said address has been transferred before said deletion.

3. The telecommunication equipment according to claim 1, characterized in that said storage means comprises at least three storage locations reserved for storing short messages corresponding to at least three predetermined addresses.

4. The telecommunication equipment according to claim 3, characterized in that said predetermined addresses respectively correspond to:

information regarding an answering machine management service;

information corresponding to a download message;

information regarding the user's telephone consumption.

5. The telecommunication equipment according to claim 1, characterized in that at least one of said predetermined addresses is downloadable.

6. The telecommunication equipment according to claim 1, characterized in that a radiotelephone of a radiocommunication system is involved.

7. The telecommunication equipment according to claim 6, characterized in that said radiocommunication system belongs to the group of:

GSM-type radiocommunication systems;
DCS 1800-type radiocommunication systems;
PCS 1900-type radiocommunication systems;
UMTS-type radiocommunication systems;
DECT-type radiocommunication systems.

8. The telecommunication equipment according to claim 1, characterized in that said storage means and/or said buffer memory is at least partially present on a removable data medium to be inserted into a corresponding drive of said telecommunication equipment, and in that said removable data medium is integrated at least partially into a subscriber identity module.

9. A method for managing means for storing short messages received and/or to be transmitted by a telecommunication equipment, each of said short messages comprising a header field and a data field, said storage means comprising N short message storage locations, characterized in that it comprises a step of reserving at least one of said storage locations for storing short messages having a predetermined address, set by the operator implementing said telecommunication equipment, said predetermined address being stored permanently in the memory area corresponding to the header field of the short message of said reserved storage location, such that if a user deletes the contents of said reserved storage location, immediately thereafter said predetermined address is reloaded into said memory area corresponding to the header field.

10. A telecommunication system comprising:

a telephone handset;

a message storage means disposed within the telephone handset, the message storage means having N short message storage locations for storing short messages, wherein one or more of the N short message storage locations is a reserved storage location for permanently storing one or more short messages each having a predetermined address set by an operator implementing the telecommunication system, such that if a user deletes a stored message from the reserved storage location, immediately thereafter the stored message is reloaded into the reserved storage location corresponding to the predetermined address.

11. The telecommunication system of claim 10, wherein each short message comprises:

a data field for holding message data; and a header field containing a memory address.

12. The telecommunication system of claim 11 wherein each permanently stored short message has a header containing a memory address corresponding to the reserved storage location.

13. The telecommunication system of claim 10, wherein at least one of the predetermined addresses is downloadable.

* * * * *